(12) United States Patent
Nakanishi et al.

(10) Patent No.: US 9,928,960 B2
(45) Date of Patent: Mar. 27, 2018

(54) MONOLITHIC CERAMIC CAPACITOR AND METHOD FOR MANUFACTURING THE SAME

(71) Applicant: Murata Manufacturing Co., Ltd., Nagaokakyo-shi, Kyoto-fu (JP)

(72) Inventors: Toru Nakanishi, Nagaokakyo (JP); Toshihiro Okamatsu, Nagaokakyo (JP); Akihiro Tsuru, Nagaokakyo (JP); Hiroyuki Wada, Nagaokakyo (JP)

(73) Assignee: MURATA MANUFACTURING CO., LTD., Nagoakakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/744,123

(22) Filed: Jun. 19, 2015

(65) Prior Publication Data
US 2015/0287535 A1    Oct. 8, 2015

Related U.S. Application Data

(63) Continuation of application No. PCT/JP2013/072108, filed on Aug. 19, 2013.

(30) Foreign Application Priority Data

Dec. 21, 2012  (JP) .................. 2012-280254

(51) Int. Cl.
*C04B 35/468*   (2006.01)
*H01G 4/12*     (2006.01)
(Continued)

(52) U.S. Cl.
CPC .......... *H01G 4/30* (2013.01); *C04B 35/4682* (2013.01); *H01G 4/01* (2013.01); *H01G 4/1227* (2013.01);
(Continued)

(58) Field of Classification Search
CPC .................. C04B 35/4682; H01G 4/1227
See application file for complete search history.

(56) References Cited

U.S. PATENT DOCUMENTS 5,650,367 A    7/1997   Fujikawa et al.
5,731,950 A    3/1998   Sakamoto et al.
(Continued)

FOREIGN PATENT DOCUMENTS

EP    814486     * 12/1997
JP    S53-47920 B2  12/1978
(Continued)

OTHER PUBLICATIONS

International Search Report issued for PCT/JP2013/072108, dated Nov. 26, 2013.
(Continued)

*Primary Examiner* — Karl E Group
(74) *Attorney, Agent, or Firm* — Arent Fox LLP

(57) ABSTRACT

A monolithic ceramic capacitor that contains a perovskite compound including Ba and Ti and at least one type of element selected from Gd, Tb, and Dy, and contains elements selected from Y, Si, Mn, Mg, and Zr. The content a of at least one element selected from Gd, Tb, and Dy satisfies $0.2 \leq a \leq 0.8$, the content b of Y satisfies $0.0 \leq b \leq 0.5$, the content c of Si satisfies $0.0 \leq c \leq 2.5$, the content d of Mn satisfies $0.0 \leq d \leq 0.25$, the content e of Mg satisfies $0.0 \leq e \leq 1.2$, the content f of Zr satisfies $0.0 \leq f \leq 0.5$, and the molar ratio m of the content of Ba/(f+the content of Ti) satisfies $0.99 \leq m \leq 1.01$, where the total content of Ti is 100 parts by mole.

17 Claims, 3 Drawing Sheets

(51) Int. Cl.
*H01G 4/30* (2006.01)
*H01G 4/01* (2006.01)
*H01G 4/224* (2006.01)
*H01G 4/008* (2006.01)

(52) U.S. Cl.
CPC .......... *H01G 4/1245* (2013.01); *H01G 4/224* (2013.01); *C04B 2235/3206* (2013.01); *C04B 2235/3224* (2013.01); *C04B 2235/3225* (2013.01); *C04B 2235/3244* (2013.01); *C04B 2235/3262* (2013.01); *C04B 2235/3418* (2013.01); *C04B 2235/79* (2013.01); *H01G 4/0085* (2013.01)

(56) References Cited

U.S. PATENT DOCUMENTS

| | | | | |
|---|---|---|---|---|
| 6,310,761 | B1* | 10/2001 | Hori | C01G 23/002 361/321.2 |
| 6,645,897 | B2* | 11/2003 | Nakamura | B32B 18/00 361/306.3 |
| 7,273,825 | B2* | 9/2007 | Muto | H01G 4/30 361/321.4 |
| 7,381,672 | B2* | 6/2008 | Hiramatsu | B32B 18/00 361/321.4 |
| 7,710,712 | B2* | 5/2010 | Takeoka | C04B 35/4682 361/321.2 |
| 7,759,269 | B2* | 7/2010 | Takahashi | B82Y 30/00 501/138 |
| 7,796,373 | B2* | 9/2010 | Sasabayashi | C04B 35/4682 29/25.42 |
| 8,335,073 | B2* | 12/2012 | Komatsu | C04B 35/465 361/306.1 |
| 8,466,078 | B2* | 6/2013 | Oh | C03B 19/102 361/321.4 |
| 8,593,038 | B2* | 11/2013 | Kang | H01F 17/0013 310/358 |
| 8,673,799 | B2* | 3/2014 | Sato | C04B 35/4682 361/321.4 |
| 8,962,506 | B2* | 2/2015 | Kim | C04B 35/468 361/321.4 |
| 9,036,331 | B2* | 5/2015 | Yoon | C04B 35/4682 361/321.4 |
| 2002/0098969 | A1* | 7/2002 | Nakamura | B32B 18/00 501/137 |
| 2004/0005982 | A1* | 1/2004 | Park | C04B 35/4682 501/139 |
| 2007/0142210 | A1* | 6/2007 | Muto | H01G 4/30 501/138 |
| 2009/0086407 | A1* | 4/2009 | Takahashi | B82Y 30/00 361/321.5 |
| 2009/0310279 | A1* | 12/2009 | Sasabayashi | C04B 35/4682 361/321.4 |
| 2010/0033895 | A1* | 2/2010 | Yao | H01G 4/1227 361/321.4 |
| 2010/0214717 | A1* | 8/2010 | Nakamura | H01G 4/30 361/303 |
| 2011/0222205 | A1* | 9/2011 | Muraki | C01G 23/006 361/321.5 |
| 2011/0222206 | A1* | 9/2011 | Komatsu | C04B 35/465 361/321.5 |
| 2012/0113562 | A1* | 5/2012 | Kang | C04B 35/4682 361/321.2 |
| 2013/0083449 | A1* | 4/2013 | Yoon | C04B 35/4682 361/321.4 |

FOREIGN PATENT DOCUMENTS

| | | | |
|---|---|---|---|
| JP | H01-201070 | A | 8/1989 |
| JP | H08-151260 | A | 6/1996 |
| JP | H09-171937 | A | 6/1997 |
| JP | 2001-143955 | A | 5/2001 |
| JP | 2002029835 | * | 1/2002 |
| JP | 2002087880 | * | 3/2002 |
| JP | 2002338344 | * | 11/2002 |
| JP | 2009-84112 | A | 4/2009 |
| JP | 2011-184279 | A | 9/2011 |
| JP | 2011-190122 | A | 9/2011 |

OTHER PUBLICATIONS

Written Opinion of the International Searching Authority issued for PCT/JP2013/072108, dated Nov. 26, 2013.

* cited by examiner

MONOLITHIC CERAMIC CAPACITOR AND METHOD FOR MANUFACTURING THE SAME

CROSS REFERENCE TO RELATED APPLICATIONS

The present application is a continuation of International application No. PCT/JP2013/072108, filed Aug. 19, 2013, which claims priority to Japanese Patent Application No. 2012-280254, filed Dec. 21, 2012, the entire contents of each of which are incorporated herein by reference.

FIELD OF THE INVENTION

The present invention relates to a monolithic ceramic capacitor by using dielectric ceramics and a method for manufacturing the same.

BACKGROUND OF THE INVENTION

In recent years, cost reduction, miniaturization, and an increase in capacity of a monolithic ceramic capacitor have been required intensely. Therefore, the monolithic ceramic capacitor is desired to have a high relative dielectric constant, while good temperature characteristics and high reliability are maintained, as characteristics.

Then, as measures against this, Patent Document 1 proposes a monolithic ceramic capacitor having a high relative dielectric constant ($\varepsilon$>3,500) and maintaining good temperature characteristics (within ±15% in the temperature range of −25° C. to 85° C. and within ±22% in the temperature range of −55° C. to 105° C.). In this monolithic ceramic capacitor, a dielectric magnetic composition is used while containing $BaTiO_3$, which serves as a primary component, and secondary components, which include 0.50 to 2.50 mol of MgO, 0.05 to 0.35 mol of MnO, 0.40 to 1.50 mol of $R_2O_3$ (where R represents rare earth elements other than Gd), 0.03 to 0.10 mol of $Gd_2O_3$ (where 0.10 mol is excluded), 0.20 to 0.70 mol of $BaZrO_3$, and 0.02 to 0.15 mol of oxides of elements selected from the group consisting of V, Ta, Mo, Nb, and W in terms of each oxide or compound oxide relative to 100 mol of primary component.

Patent Document 1: Japanese Unexamined Patent Application Publication No. 2009-84112

SUMMARY OF THE INVENTION

However, there is a problem that the monolithic ceramic capacitor in Patent Document 1 cannot have a relative dielectric constant of more than 4,500. The reason is that if the relative dielectric constant of the dielectric magnetic composition described in Patent Document 1 is more than 4,500, good temperature characteristics (within ±15% in the temperature range of −25° C. to 85° C.) cannot be ensured and the reliability becomes unsatisfactory.

Accordingly, it is an object of the present invention to provide a monolithic ceramic capacitor, which can have a high relative dielectric constant of more than 4,500 while maintaining good temperature characteristics and high reliability, and a method for manufacturing the same.

The present invention provides a monolithic ceramic capacitor that includes a multilayer body formed from a plurality of dielectric ceramic layers and a plurality of inner electrodes disposed at interfaces between the plurality of dielectric ceramic layers and outer electrodes disposed on the outer surface of the multilayer body and electrically connected to the inner electrodes.

The multilayer body contains a perovskite compound including Ba and Ti, contains at least one type of element selected from the group consisting of Gd, Tb, and Dy and contains elements optionally selected from the group consisting of Y, Si, Mn, Mg, and Zr.

The content a (parts by mole) of at least one type of element selected from the group consisting of Gd, Tb, and Dy satisfies $0.2 \leq a \leq 0.8$.

The content b (parts by mole) of Y satisfies $0.0 \leq b \leq 0.5$.
The content c (parts by mole) of Si satisfies $0.0 \leq c \leq 2.5$.
The content d (parts by mole) of Mn satisfies $0.0 \leq d \leq 0.25$.
The content e (parts by mole) of Mg satisfies $0.0 \leq e \leq 1.2$.
The content f (parts by mole) of Zr satisfies $0.0 \leq f \leq 0.5$.
The molar ratio m of the content of Ba/(the content of Zr+the content of Ti) satisfies $0.99 \leq m \leq 1.01$, where the total content of Ti is specified to be 100 parts by mole.

Also, the present invention provides a monolithic ceramic capacitor including a multilayer body formed from a plurality of dielectric ceramic layers and a plurality of inner electrodes disposed at interfaces between the plurality of dielectric ceramic layers and outer electrodes disposed on the outer surface of the multilayer body and electrically connected to the inner electrodes.

The multilayer body contains a perovskite compound including Ba and Ti, contains at least one type of element selected from the group consisting of Gd, Tb, and Dy and contains elements optionally selected from the group consisting of Y, Si, Mn, Mg, and Zr.

the content a (parts by mole) of at least one type of element selected from the group consisting of Gd, Tb, and Dy satisfies $0.2 \leq a \leq 0.8$,
the content b (parts by mole) of Y satisfies $0.0 \leq b \leq 0.5$,
the content c (parts by mole) of Si satisfies $0.0 \leq c \leq 2.5$,
the content d (parts by mole) of Mn satisfies $0.0 \leq d \leq 0.25$,
the content e (parts by mole) of Mg satisfies $0.0 \leq e \leq 1.2$,
the content f (parts by mole) of Zr satisfies $0.0 \leq f \leq 0.5$, and
the molar ratio m of the content of Ba/(the content of Zr+the content of Ti) satisfies $0.99 \leq m \leq 1.01$,
in the case where the multilayer body is made into a solution by a dissolution treatment and the total content of Ti is specified to be 100 parts by mole.

Also, the present invention provides a monolithic ceramic capacitor including a multilayer body formed from a plurality of dielectric ceramic layers and a plurality of inner electrodes disposed at interfaces between the plurality of dielectric ceramic layers and outer electrodes disposed on the outer surface of the multilayer body and electrically connected to the inner electrodes.

The dielectric ceramic layer contains a perovskite compound including Ba and Ti, contains at least one type of element selected from the group consisting of Gd, Tb, and Dy and contains elements optionally selected from the group consisting of Y, Si, Mn, Mg, and Zr,
the content a (parts by mole) of at least one type of element selected from the group consisting of Gd, Tb, and Dy satisfies $0.2 \leq a \leq 0.8$,
the content b (parts by mole) of Y satisfies $0.0 \leq b \leq 0.5$,
the content c (parts by mole) of Si satisfies $0.0 \leq c \leq 2.5$,
the content d (parts by mole) of Mn satisfies $0.0 \leq d \leq 0.25$,
the content e (parts by mole) of Mg satisfies $0.0 \leq e \leq 1.2$,
the content f (parts by mole) of Zr satisfies $0.0 \leq f \leq 0.5$, and
the molar ratio m of the content of Ba/(the content of Zr+the content of Ti) satisfies $0.99 \leq m \leq 1.01$,
where the total content of Ti is specified to be 100 parts by mole.

According to the present invention, at least one type of element selected from the group consisting of Gd, Tb, and Dy and elements selected from the group consisting of Y, Si, Mn, Mg, and Zr are added as secondary components to the perovskite compound including Ba and Ti as primary components under a predetermined composition condition, so that a monolithic ceramic capacitor exhibiting high reliability while maintaining a high relative dielectric constant ∈ and good temperature characteristics is produced.

Meanwhile, in the monolithic ceramic capacitor according to the present invention, preferably, the plurality of dielectric ceramic layers has crystal grains and the average grain size of the crystal grains is 0.5 μm or less.

In the present invention, the grain sizes of crystal grains of the dielectric ceramic layer are small and, thereby, the surface areas of crystal grains increase and the rate of change in the electrostatic capacitance (DC bias characteristics) when a direct current voltage is applied becomes better.

Also, in the monolithic ceramic capacitor according to the present invention, the relative dielectric constant ∈ of the dielectric ceramic layer is preferably more than 5,500. Consequently, a monolithic ceramic capacitor having a high relative dielectric constant ∈ is produced.

Also, in the monolithic ceramic capacitor according to the present invention, preferably, the inner electrode contains Ni or an Ni alloy as a primary component. Consequently, a low-cost monolithic ceramic capacitor is produced.

Also, the present invention provides a method for manufacturing a monolithic ceramic capacitor including the steps of obtaining a ceramic slurry by adding a compound containing at least one type of element selected from the group consisting of Gd, Tb, and Dy to a powder containing a perovskite compound including Ba and Ti, adding a compound optionally selected from the group consisting of compounds containing Y, compounds containing Si, compounds containing Mn, compounds containing Mg, and compounds containing Zr, and performing mixing and slurrying, producing ceramic green sheets by forming the ceramic slurry into the shape of a sheet, forming an unfired multilayer body in which the ceramic green sheets and conductor patterns serving as inner electrodes after firing are stacked, and producing a multilayer body having a structure, in which inner electrodes are disposed at interfaces between the plurality of dielectric ceramic layers stacked, by firing the unfired multilayer body, wherein in the ceramic slurry, the content a (parts by mole) of at least one type of element selected from the group consisting of Gd, Tb, and Dy satisfies 0.2≤a≤0.8, the content b (parts by mole) of Y satisfies 0.0≤b≤0.5,
the content c (parts by mole) of Si satisfies 0.0≤c≤2.5,
the content d (parts by mole) of Mn satisfies 0.0≤d≤0.25,
the content e (parts by mole) of Mg satisfies 0.0≤e≤1.2,
the content f (parts by mole) of Zr satisfies 0.0≤f≤0.5, and
the molar ratio m of the content of Ba/(the content of Zr+the content of Ti) satisfies 0.99≤m≤1.01, where the total content of Ti is specified to be 100 parts by mole.

Also, the present invention provides a method for manufacturing a monolithic ceramic capacitor including the steps of adding a compound containing at least one type of element selected from the group consisting of Gd, Tb, and Dy to a powder containing a perovskite compound including Ba and Ti, adding a compound optionally selected from the group consisting of compounds containing Y, compounds containing Si, compounds containing Mn, compounds containing Mg, and compounds containing Zr, performing mixing to obtain a mixture, and obtaining a ceramic slurry by slurrying the resulting mixture, producing ceramic green sheets by forming the ceramic slurry into the shape of a sheet, forming an unfired multilayer body in which the ceramic green sheets and conductor patterns serving as inner electrodes after firing are stacked, and producing a multilayer body having a structure, in which inner electrodes are disposed at interfaces between the plurality of dielectric ceramic layers stacked, by firing the unfired multilayer body, wherein in the mixture, the content a (parts by mole) of at least one type of element selected from the group consisting of Gd, Tb, and Dy satisfies 0.2≤a≤0.8, the content b (parts by mole) of Y satisfies 0.0≤b≤0.5,
the content c (parts by mole) of Si satisfies 0.0≤c≤2.5,
the content d (parts by mole) of Mn satisfies 0.0≤d≤0.25,
the content e (parts by mole) of Mg satisfies 0.0≤e≤1.2,
the content f (parts by mole) of Zr satisfies 0.0≤f≤0.5, and
the molar ratio m of the content of Ba/(the content of Zr+the content of Ti) satisfies 0.99≤m≤1.01, where the total content of Ti is specified to be 100 parts by mole.

According to the present invention, a monolithic ceramic capacitor exhibiting a high relative dielectric constant ∈, good temperature characteristics, and high reliability is produced with good mass-productivity.

Advantageous Effects of Invention

According to the present invention, at least one type of element selected from the group consisting of Gd, Tb, and Dy and elements selected from the group consisting of Y, Si, Mn, Mg, and Zr, which are elements added as secondary components, are added under a predetermined composition condition, so that a monolithic ceramic capacitor exhibiting a high relative dielectric constant ∈, good temperature characteristics, and high reliability is produced.

The above-described objects, other objects, features, and advantages of the present invention will become more apparent from the following description of embodiments of the present invention with reference to the drawings.

DETAILED DESCRIPTION OF THE PREFERRED EMBODIMENTS

An embodiment of a monolithic ceramic capacitor and a method for manufacturing the same according to the present invention will be described.

1. Monolithic Ceramic Capacitor

Figure 1:
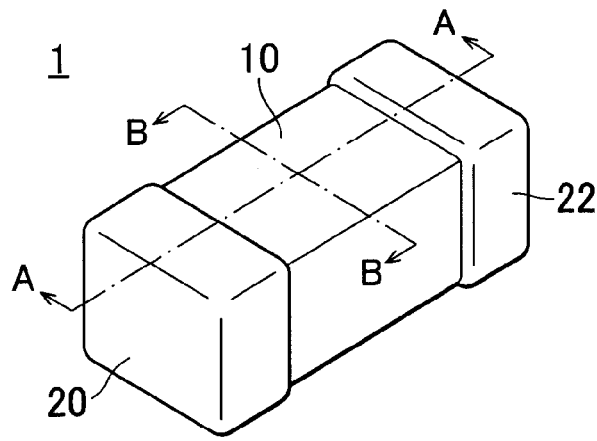
FIG. 1 is an appearance perspective view showing an embodiment of a monolithic ceramic capacitor according to the present invention.

FIG. 1 is an appearance perspective view showing a monolithic ceramic capacitor 1. The monolithic ceramic capacitor 1 includes a multilayer body 10 and outer electrodes 20 and 22 disposed on left and right end surfaces of the multilayer body 10.

Figure 2:
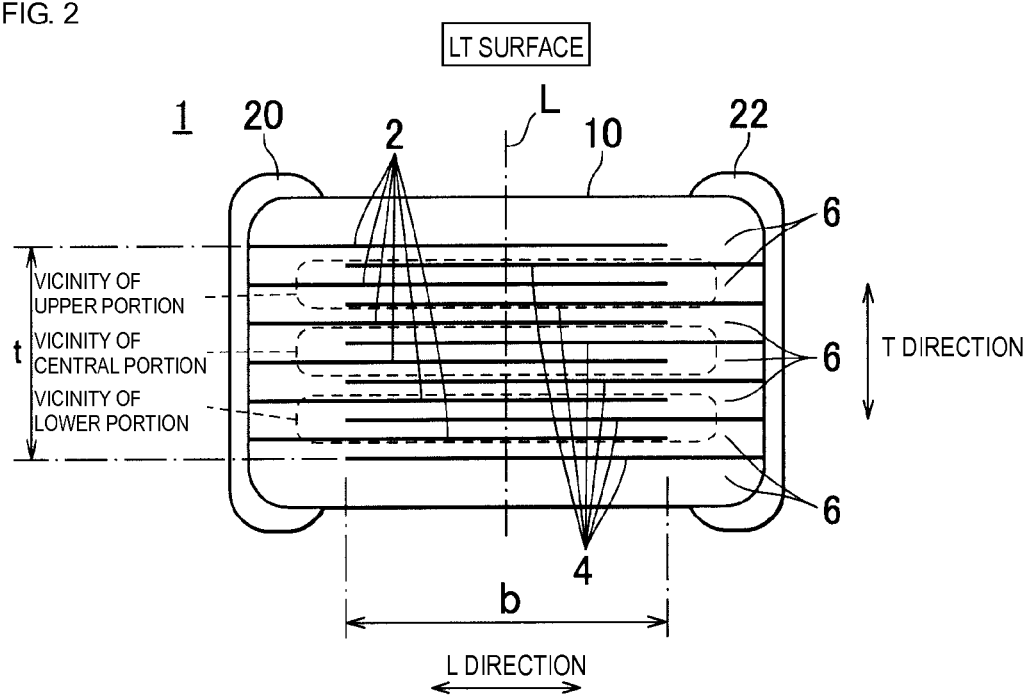
FIG. 2 is a sectional view (LT sectional view) of a cross-section taken along a line A-A shown in FIG. 1.
Figure 3:
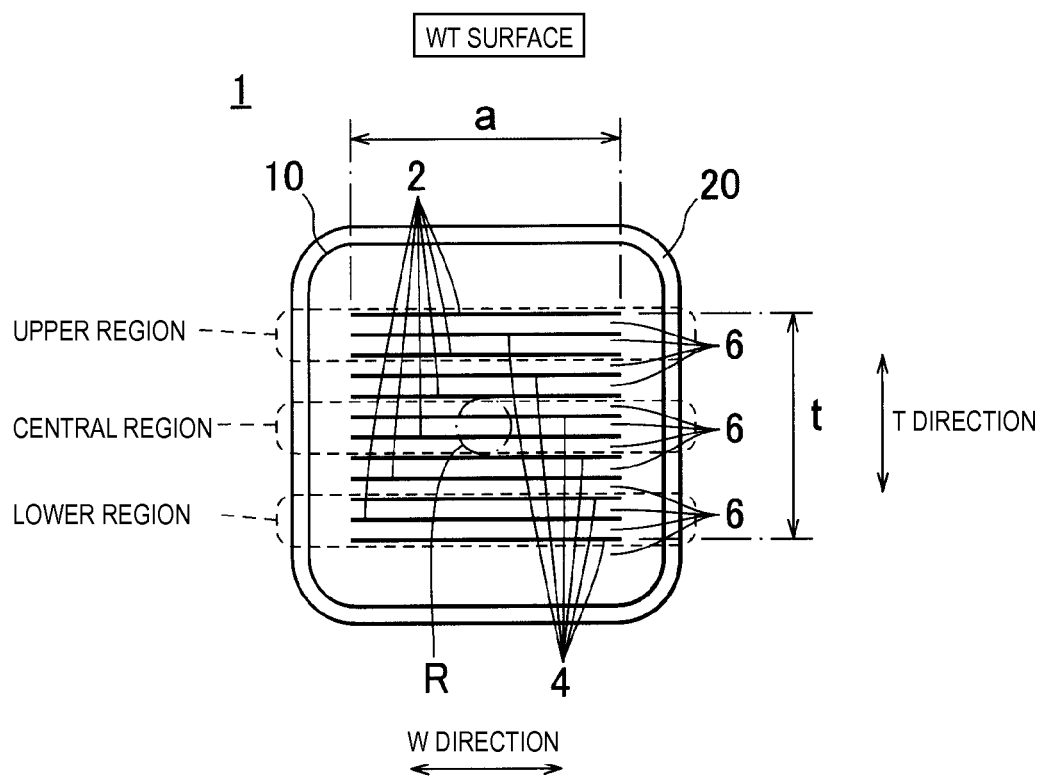
FIG. 3 is a sectional view (WT sectional view) of a cross-section taken along a line B-B shown in FIG. 1.

FIG. 2 is a sectional view (LT sectional view) of a cross-section taken along a line A-A shown in FIG. 1. FIG. 3 is a sectional view (WT sectional view) of a cross-section taken along a line B-B shown in FIG. 1. The multilayer body 10 is formed from a plurality of dielectric ceramic layers 6 and a plurality of inner electrodes 2 and 4 disposed at interfaces between the plurality of dielectric ceramic layers 6. That is, the multilayer body 10 has a structure in which the plurality of dielectric ceramic layers 6 and the plurality of inner electrodes 2 and 4 are stacked alternately in the thickness direction (T direction).

The inner electrode 2 and the inner electrode 4 are opposite to each other with the dielectric ceramic layer 6 therebetween in the thickness direction. An electrostatic capacitance is formed in this portion in which the inner electrode 2 and the inner electrode 4 are opposite to each other with the dielectric ceramic layer 6 therebetween.

The inner electrodes 2 and 4 are made from Ag, Cu, Ni, Pd, alloys of these metals, or the like. In particular, in the case where the inner electrodes 2 and 4 are made from Ni or a Ni alloy, the cost of the monolithic ceramic capacitor 1 can be reduced.

The left end portions of the inner electrodes 2 are led to the left end surface of the multilayer body 10 and are electrically connected to the outer electrode 20. The right end portions of the inner electrodes 4 are led to the right end surface of the multilayer body 10 and are electrically connected to the outer electrode 22.

The dielectric ceramic layers 6 (multilayer body 10) contains a perovskite compound including Ba and Ti serving as primary components and at least one type of rare earth element selected from the group consisting of Gd, Tb, and Dy serving as a secondary component and contains elements optionally selected from the group consisting of Y, Si, Mn, Mg, and Zr serving as secondary components. In addition, the dielectric ceramic layers 6 may contain elements selected from the group consisting of Ho, La, Sm, Eu, Er, Tm, and Yb serving as secondary components. However, each element of Ho, La, Sm, Eu, Er, Tm, and Yb is not always necessary.

In this regard, (a) the content a (parts by mole) of at least one type of rare earth element selected from the group consisting of Gd, Tb, and Dy satisfies $0.2 \leq a \leq 0.8$, (b) the content b (parts by mole) of Y satisfies $0.0 \leq b \leq 0.5$, (c) the content c (parts by mole) of Si satisfies $0.0 \leq c \leq 2.5$, (d) the content d (parts by mole) of Mn satisfies $0.0 \leq d \leq 0.25$, (e) the content e (parts by mole) of Mg satisfies $0.0 \leq e \leq 1.2$, (f) the content f (parts by mole) of Zr satisfies $0.0 \leq f \leq 0.5$, and (g) the molar ratio m of the content of Ba/(the content of Zr+the content of Ti) satisfies $0.99 \leq m \leq 1.01$, where the total content of Ti is specified to be 100 parts by mole.

Meanwhile, each of the dielectric ceramic layers 6 has crystal grains and the average grain size of the crystal grains is 0.5 μm or less. Therefore, the grain sizes of the crystal grains are small, so that the surface areas of the crystal grains increase, the DC bias characteristics become better, and the numerical value of the DC bias characteristics can be made larger than −70%. Put another way, the rate of decrease in DC bias characteristics can be made smaller than 70%.

The monolithic ceramic capacitor 1 having the above-described configuration can exhibit a high dielectric constant $\in$ (>5,500) and good temperature characteristics by adding at least one type of element selected from the group consisting of Gd, Tb, and Dy and elements selected from the group consisting of Y, Si, Mn, Mg, and Zr, which are elements added as secondary components, under the above-described composition conditions of the items (a) to (g). Then, the monolithic ceramic capacitor 1 can exhibit high reliability while maintaining a high relative dielectric constant $\in$ and good temperature characteristics by adding at least one type of element selected from the group consisting of Gd, Tb, and Dy in such a way that the content a (parts by mole) satisfies $0.2 \leq a \leq 0.8$.

2. Method for Manufacturing Monolithic Ceramic Capacitor

Figure 4:
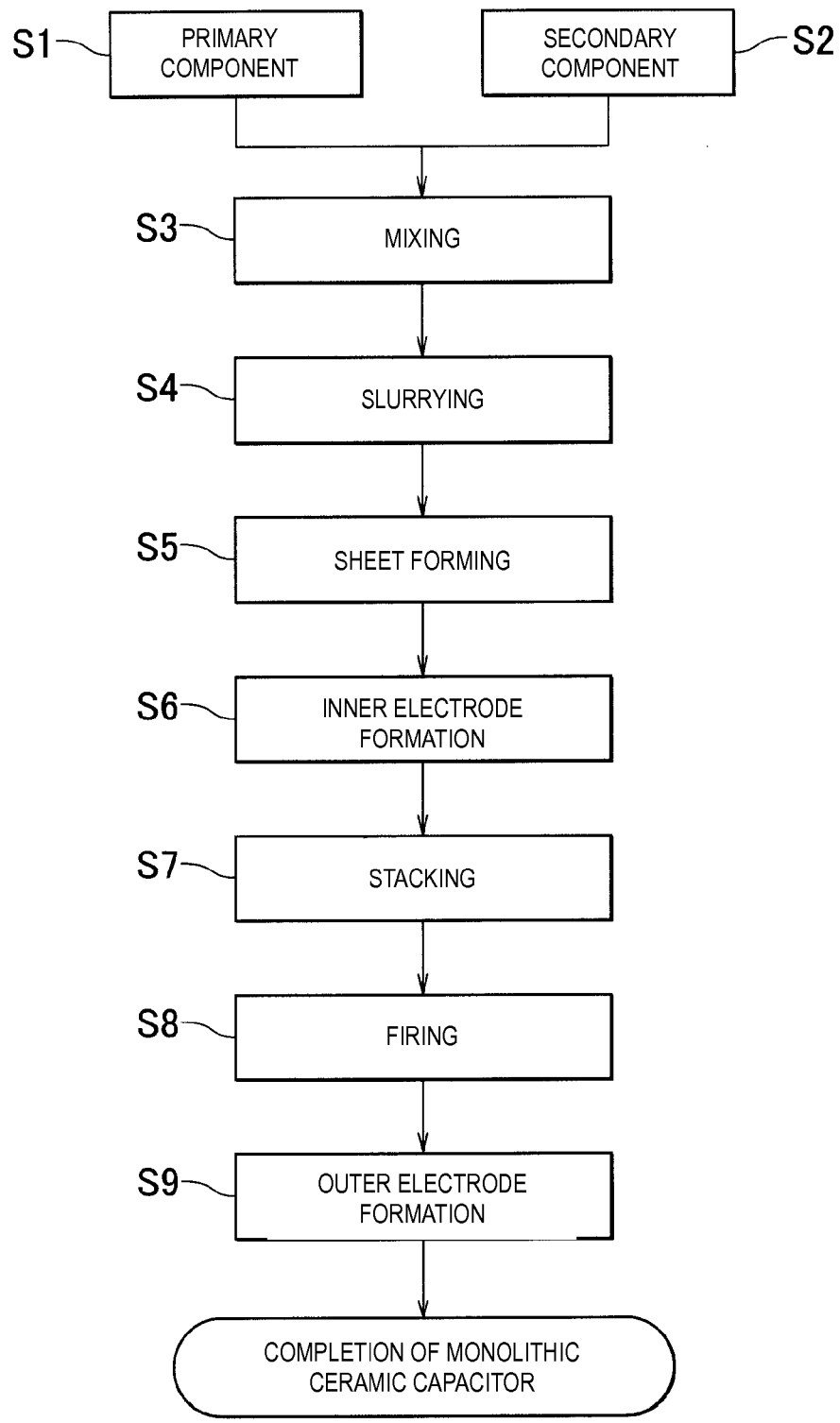
FIG. 4 is a flow chart showing an embodiment of a method for manufacturing a monolithic ceramic capacitor according to the present invention.

Next, a method for manufacturing the above-described monolithic ceramic capacitor 1 will be described. FIG. 4 is a flow chart showing the method for manufacturing the monolithic ceramic capacitor 1.

In the step S1, a high-purity powder of each of $BaCO_3$ and $TiO_2$ is prepared as a starting material for barium titanate serving as a primary component, and predetermined amounts of them are weighed and blended. Subsequently, the resulting blend powder is uniformly dispersed by wet mixing with a ball mill. Thereafter, a drying treatment is performed to produce an adjusted powder. The resulting adjusted powder is calcined at a temperature of 1,000° C. to 1,200° C. to be converted to a primary component powder having an average particle diameter of 0.3 to 0.5 μm. This primary component powder is a powder containing a perovskite compound including Ba and Ti.

Next, in the step S2, a compound powder of each of $Gd_2O_3$, $Tb_2O_3$, $Dy_2O_3$, $Y_2O_3$, $Ho_2O_3$, $La_2O_3$, $Sm_2O_3$, $Eu_2O_3$, $Er_2O_3$, $Tm_2O_3$, $Yb_2O_3$, $SiO_2$, $MnCO_3$, $MgCO_3$, and $ZrO_2$ is prepared as a secondary component. However, the compound powder of each of $Ho_2O_3$, $La_2O_3$, $Sm_2O_3$, $Eu_2O_3$, $Er_2O_3$, $Tm_2O_3$, and $Yb_2O_3$ is not always necessary. These compound powders are weighed in such a way that the content of each component satisfies the composition conditions shown in the items (a) to (g) described below, where the total content of Ti contained in the primary component is specified to be 100 parts by mole (specific examples of weighing are shown in Table 1 and Table 2 described later).

(a) The content a (parts by mole) of at least one type of element selected from the group consisting of Gd contained in a $Gd_2O_3$ compound powder, Tb contained in a $Tb_2O_3$ compound powder, and Dy contained in a $Dy_2O_3$ compound powder satisfies $0.2 \leq a \leq 0.8$ (b) The content b (parts by mole) of Y contained in a $Y_2O_3$ compound powder satisfies $0.0 \leq b \leq 0.5$ (c) The content c (parts by mole) of Si contained in a $SiO_2$ compound powder satisfies $0.0 \leq c \leq 2.5$ (d) The content d (parts by mole) of Mn contained in a $MnCO_3$ compound powder satisfies $0.0 \leq d \leq 0.25$ (e) The content e (parts by mole) of Mg contained in a $MgCO_3$ compound powder satisfies $0.0 \leq e \leq 1.2$ (f) The content f (parts by mole) of Zr contained in a $ZrO_2$ compound powder satisfies $0.0 \leq f \leq 0.5$ (g) The molar ratio m of the content of Ba contained in the primary component powder/(the content of Zr contained in the $ZrO_2$ compound powder+the content of Ti contained in the primary component powder) satisfies $0.99 \leq m \leq 1.01$ Next, in the step S3, the weighed compound powder of the secondary component is blended with the primary component powder and, thereby, a mix powder (mixture) is produced. That is, at least one type of compound powder selected from the group consisting of the $Gd_2O_3$ compound powder, the $Tb_2O_3$ compound powder, and the $Dy_2O_3$ compound powder serving as the secondary component is added to the barium titanate powder serving as the primary component and, in addition, compound powders selected from the group consisting of the $Y_2O_3$ compound powder, the $SiO_2$ compound powder, the $MnCO_3$ compound powder, the $MgCO_3$ compound powder, the $ZrO_2$ compound powder, and the like are added and mixed.

Subsequently, the resulting mix powder is uniformly dispersed by wet mixing with a ball mill. Thereafter, a drying treatment is performed to produce a ceramic raw material powder. In the case where YSZ balls are used as media (mixing assistance tools) in the wet mixing process with the ball mill, Zr and Y contained in the YSZ balls may be mixed into the weighed ceramic raw material powder. In that case, the blend ratio of the ceramic raw material powder is adjusted in such a way as to satisfy the composition conditions shown in the above-described items (a) to (g) while the amounts of mixing of Zr and Y contained in the YSZ balls are taken into consideration.

Next, in the step S4, a polyvinyl butyral base binder, a plasticizer, and an organic solvent (ethanol) are added to the ceramic raw material powder and, thereafter, they are wet-mixed with a ball mill, so that a ceramic slurry is produced.

Next, in the step S5, the ceramic slurry is formed into the shape of a sheet by a lip system, so that rectangular ceramic green sheets are produced.

Next, in the step S6, an electrically conductive paste containing Ni or a Ni alloy is screen-printed on the ceramic green sheets and, thereby, electrically conductive paste films (conductor patterns) serving as inner electrodes 2 and 4 are formed.

Next, in the step S7, a plurality of ceramic green sheets provided with the electrically conductive paste films are stacked in such a way that the leading directions of the end portions of the electrically conductive paste films are brought into a staggered format, so that an unfired multilayer body 10 to become a main body of the monolithic ceramic capacitor 1 is formed.

Next, in the step S8, the unfired multilayer body 10 is heated in a $N_2$ atmosphere at a temperature of 350° C. for 3 hours, so that the binder is burnt. Thereafter, the unfired multilayer body 10 is fired at a temperature of 1,150° C. to 1,250° C. for 2 hours in a reducing atmosphere composed of a $H_2$—$N_2$—$H_2O$ gas at an oxygen partial pressure of $10^{-9}$ to $10^{-12}$ MPa, so that a sintered multilayer body 10 is produced. The ceramic green sheets and the electrically conductive paste films are fired at the same time, the ceramic green sheets are made into the dielectric ceramic layers 6, and the electrically conductive paste films are made into the inner electrodes 2 and 4.

Next, in the step S9, a Cu paste containing glass frit is applied to both end surfaces of the sintered multilayer body 10. Thereafter, the Cu paste is baked on the sintered multilayer body 10 in a $N_2$ atmosphere at a temperature of 800° C., so that the outer electrodes 20 and 22 electrically connected to the inner electrodes 2 and 4 are formed.

In this manner, the monolithic ceramic capacitor 1 exhibiting a high relative dielectric constant ∈, good temperature characteristics, and high reliability is produced with good mass-productivity. The outer dimensions of the resulting monolithic ceramic capacitor 1 are 2.0 mm in length, 1.2 mm in width, and 1.0 mm in thickness. The thickness of the dielectric ceramic layer 6 interposed between the inner electrode 2 and the inner electrode 4 is 2.0 μm. Also, the number of effective dielectric ceramic layers is 100 layers, and the opposite electrode area of one dielectric ceramic layer 6 is 1.7 mm².

EXAMPLES

1. Examples and Comparative Examples

A monolithic ceramic capacitor 1 of each of examples and comparative examples was produced by the manufacturing method according to the above-described embodiment and the characteristics were evaluated. At that time, a high-purity powder of each of $BaCO_3$ and $TiO_2$ was prepared as a starting material for barium titanate serving as a primary component powder, and predetermined amounts of them were weighed and blended. The amount of addition of the $Gd_2O_3$ compound powder, the amount of addition of the $Tb_2O_3$ compound powder, the amount of addition of the $Dy_2O_3$ compound powder, the amount of addition of the $Y_2O_3$ compound powder, the amount of addition of other rare earth element compound powder, the amount of addition of the $SiO_2$ compound powder, the amount of addition of the $MnCO_3$ compound powder, the amount of addition of the $MgCO_3$ compound powder, and the amount of addition of the $ZrO_2$ compound powder, serving as the secondary components, were adjusted in such a way that the contents of Gd, Tb, Dy, Y, Ho, La, Sm, Eu, Er, Tm, Yb, Si, Mn, Mg, and Zr and the Ba/(Ti+Zr) molar ratio became the compositions shown in Table 1, Table 2, and Table 3, where the total content of Ti contained in barium titanate serving as the primary component was specified to be 100 parts by mole. These secondary components were weighed and, thereafter, were blended with the barium titanate primary component powder.

(Examination of Composition of Ceramic Slurry)

In the production step, the ceramic raw material powder in each ceramic slurry produced was dissolved with an acid and ICP emission spectrochemical analysis was performed. As a result, it was ascertained that the ceramic slurry had substantially the same compositions as the compositions shown in Table 1, Table 2, and Table 3. In this regard, the minimum limit of detection of the ICP emission spectrochemical analysis was 0.01 percent by mole and the value smaller than or equal to the minimum limit of detection was specified to be 0.

(Examination of Composition of Multilayer Body)

Also, as for the monolithic ceramic capacitor 1 produced in each of the examples and the comparative examples, the multilayer body (ceramic sintered body) 10 after the outer electrodes 20 and 22 were removed was dissolved with an acid, and the ICP emission spectrochemical analysis was performed. As a result, it was ascertained that the multilayer body 10 had substantially the same compositions as the compositions shown in Table 1, Table 2, and Table 3 except Ni in the inner electrodes 2 and 4.

2. Evaluation of Characteristics and Evaluation Method in Examples and Comparative Examples The monolithic ceramic capacitor 1 in each of the examples and the comparative examples was subjected to the following evaluations of the characteristics.

(Evaluation of Crystal Grain Size (Grain Size))

(i) Production of Observation Sample

The monolithic ceramic capacitor 1 was fractured in such a way that a WT section at the position about ½ in the length direction (L direction) was exposed. Subsequently, the monolithic ceramic capacitor 1 was heat-treated and, thereby, interfaces (grain boundaries) between crystal grains were made clear. The temperature of the heat treatment was specified to be a temperature at which crystal grains did not grow and, in addition, a temperature at which grain boundaries were made clear. In this example, the treatment was performed at 1,000° C.

(ii) Method for Evaluating Crystal Grain Size (Grain Size)

The position about ½ in the width direction (W direction) and about ½ in the thickness direction (T direction) of the WT section of the monolithic ceramic capacitor 1 (the position indicated by reference numeral R shown in FIG. 3) was observed by using a scanning electron microscope (SEM) at the magnification of 30,000 times. Then, 200 crystal grains were extracted at random from the resulting SEM photograph, the equivalent circle diameter was calculated from the area of the portion inside the grain boundary of each crystal grain on the basis of the image analysis, and this was specified to be the crystal grain size of each crystal grain. The number of evaluation samples was 5. The representative value of the crystal grain size was calculated on the basis of D50 diameter (the number of data: 200 crystal grains×5 evaluation samples=1,000 data).

(Evaluation of Relative Dielectric Constant $\in$)

(i) Measurement of Electrostatic Capacitance

After 100 monolithic ceramic capacitors 1 were heat-treated at 150° C. for 1 hour, standing at room temperature was performed for 24 hours. Subsequently, the electrostatic capacitance of each monolithic ceramic capacitor was measured by using an automatic bridge type measuring instrument under the condition of the temperature of 25° C., the alternating current electric field of 0.25 V/µm, and the measurement frequency of 1 kHz.

(ii) Measurement of Coverage of Inner Electrode

The interface between the inner electrode 2(4) and the dielectric ceramic layer 6 was peeled at the position about ½ in the thickness direction of the monolithic ceramic capacitor 1. Subsequently, the range of about 5,000 µm² in the vicinity of the center portion (at the position about ½ in the width direction (W direction) and about ½ in the length direction (L direction)) of the exposed inner electrode 2(4) was observed by using an optical microscope at the magnification of 1,000 times. Then, the proportion of the area constituted by a metal in the inner electrode 2(4) was determined on the basis of the image analysis of the resulting image. The number of evaluation samples was 5. The average of the proportions of the areas constituted by the metal in the inner electrodes 2(4) of 5 evaluation samples was specified to be the coverage (%) of the inner electrode 2(4).

(iii) Measurement of Area of Opposite Inner Electrodes

The monolithic ceramic capacitor 1 was polished to the position about ½ in the length direction, and after the polishing was finished, in order to remove roll-off of the inner electrode due to polishing, the WT polished surface was treated by ion milling. Thereafter, the WT polished surface was observed by using an optical microscope. As shown in FIG. 3, in the thickness direction of the monolithic ceramic capacitor 1, the dimension of the region in which the inner electrodes 2(4) were stacked was specified to be t, 0 to (t/5) was specified to be a lower region, (2t/5) to (3t/5) was specified to be a central region, and (4t/5) to t was specified to be an upper region. Then, the length in the width direction of the inner electrode 2(4) extracted at random from the vicinity of the center of each of three regions of the lower region, the central region, and the upper region was measured, and the average value a of them was calculated.

Also, the monolithic ceramic capacitor 1 was polished to the position about ½ in the width direction, and after the polishing was finished, in order to remove roll-off of the inner electrode due to polishing, the LT polished surface was treated by ion milling. Thereafter, the LT polished surface was observed by using an optical microscope. As shown in FIG. 2, in the thickness direction of the monolithic ceramic capacitor 1, the dimension of the region in which the inner electrodes 2(4) were stacked was specified to be t. The length in the length direction (L direction) of a portion sandwiched between opposite inner electrodes 2 and 4 of the dielectric ceramic layer 6 extracted at random from each of three regions in the vicinity of the lower portion (in the vicinity of t/5), in the vicinity of the central portion (in the vicinity of t/2), and in the vicinity of the upper portion (in the vicinity of 4t/5) was measured, and the average value b of them was calculated.

Then, the opposite electrode area was calculated on the basis of a×b. The number of evaluation samples was 3, and the average of 3 evaluation samples was used as the value of the opposite electrode area.

(iv) Measurement of Device Thickness

Each monolithic ceramic capacitor 1 was held in the attitude in which the width direction was vertical, the circumference of the monolithic ceramic capacitor 1 was hardened with a resin, and the LT surface of the monolithic ceramic capacitor 1 was fixed in such a way as to be exposed at the resin. Thereafter, each monolithic ceramic capacitor 1 was polished by using a polisher in such a way that the LT polished surface at the position about ½ in the width direction was exposed. After the polishing was finished, in order to remove roll-off of the inner electrodes 2 and 4 due to polishing, the LT polished surface was treated by ion milling.

An orthogonal line L orthogonal to the inner electrodes 2 and 4 was set at the position about ½ in the length direction of the LT polished surface (refer to FIG. 2). Then, the vicinity of the center of each region of the lower region (0 to (t/5)), the central region ((2t/5) to (3t/5)), and the upper region ((4t/5) to t) was observed by using a scanning electron microscope at the magnification of 5,000 times. In the resulting image, the thicknesses of five layers of the dielectric ceramic layer 6 on the orthogonal line L except the outermost dielectric ceramic layer 6 and portions in which at least two layers of dielectric ceramic layers 6 were connected because of lack of the inner electrodes 2 and 4 were measured in each region, and the average value of them was specified to be the device thickness.

(v) Calculation of Relative Dielectric Constant

The relative dielectric constant (corrected $\in$) was calculated by the following formula in consideration of the coverage.

relative dielectric constant=average value of electrostatic capacitance (F)×(device thickness (µm)× $10^{-6}$)÷(opposite electrode area (mm²)× $10^{-6}$)÷(electrode coverage (%)÷100)÷dielectric constant in vacuum (F/m)÷the number of effective dielectric ceramic layers In this regard, the dielectric constant in a vacuum was specified to be 8.854× $10^{-12}$ F/m, and the number of effective dielectric ceramic layers was specified to be 100.

(Measurement of Rate of Change in Electrostatic Capacitance with Temperature)

The rate of change in electrostatic capacitance with temperature was measured with respect to five monolithic ceramic capacitors 1. The electrostatic capacitance was measured under the condition of the alternating current electric field of 0.25 V/μm and the measurement frequency of 1 kHz while the temperature was changed in the temperature range of −55° C. to +85° C. The rate of change in electrostatic capacitance with temperature $\Delta C_{TC}$ was calculated on the basis of the following formula by using the electrostatic capacitance value $C_{TC}$ at which the absolute value of change was maximum with reference to the electrostatic capacitance value $C_{25}$ at 25° C. The average $\Delta C_{TC}$ value obtained from five samples was used as the rate of change in electrostatic capacitance with temperature $\Delta C_{TC}$. It is preferable that $\Delta C_{TC}$ be within ±15%.

$$\Delta C_{TC}=((C_{TC}-C_{25})/C_{25})$$

(Measurement of Life Characteristics by Loading Test) (i) Measurement of Life Characteristics by High Temperature Loading Test The monolithic ceramic capacitor 1 was heat-treated at 150° C. for 1 hour and, thereafter, standing at room temperature was performed for 24 hours. The electrostatic capacitance (C) of each monolithic ceramic capacitor was measured by using an automatic bridge type measuring instrument under the condition of the temperature of 25° C., the alternating current electric field of 0.25 V/μm, and the measurement frequency of 1 kHz. Subsequently, a direct current electric field of 12 V/μm was applied to each monolithic ceramic capacitor 1 for 1,000 hours under the condition of the temperature of 85° C. Thereafter, the insulation resistance (IR) of the monolithic ceramic capacitor 1 was measured under the condition of the temperature of room temperature and the direct current field strength of 8 V/μm. Then, the case where the CR product which was the product of the electrostatic capacitance (C) and the insulation resistance (IR) was 50 ΩF or less was judged to be failure. The number of evaluation samples was 100.

(ii) Measurement of Life Characteristics by Moisture Resistance Loading Test

The monolithic ceramic capacitor 1 was heat-treated at 150° C. for 1 hour and, thereafter, standing at room temperature was performed for 24 hours. The electrostatic capacitance (C) of each monolithic ceramic capacitor was measured by using an automatic bridge type measuring instrument under the condition of the temperature of 25° C., the alternating current electric field of 0.25 V/μm, and the measurement frequency of 1 kHz. Subsequently, a direct current electric field of 8 V/μm was applied to each monolithic ceramic capacitor 1 for 1,000 hours under the condition of the temperature of 85° C. and the humidity of 85% RH. Thereafter, the insulation resistance (IR) of the monolithic ceramic capacitor 1 was measured under the condition of the temperature of room temperature and the direct current field strength of 8 V/μm. Then, the case where the CR product which was the product of the electrostatic capacitance (C) and the insulation resistance (IR) was 50 ΩF or less was judged to be failure. The number of evaluation samples was 100.

(Measurement of Rate of Change in Electrostatic Capacitance on Application of Direct Current Voltage)

Initially, the electrostatic capacitance of the monolithic ceramic capacitor 1 was measured under the condition of the temperature of 25° C., the alternating current electric field of 0.25 V/μm, the measurement frequency of 1 kHz, and no application of direct current electric field. Subsequently, the electrostatic capacitance of the monolithic ceramic capacitor 1 was measured under the condition of the temperature of 25° C., the alternating current electric field of 0.25 V/μm, the measurement frequency of 1 kHz, and the direct current electric field of 2.5 V/μm. The rate of change in electrostatic capacitance on application of a direct current voltage (DC bias characteristics) was calculated with respect to the electrostatic capacitance on no application of direct current voltage. It is preferable that the rate of decrease in DC bias characteristics is small. The number of evaluation samples was 3, and the average of 3 evaluation samples was used as the value of the DC bias characteristics.

3. Results of Evaluation of Characteristics in Examples and Comparative Examples Table 1 and Table 2 show the results of evaluation of the characteristics in the examples and Table 3 shows the results of evaluation of the characteristics in the comparative examples.

TABLE 1

| Sample | Gd | Tb | Dy | Y | Other rare earth | Si | Mn | Mg | Zr | Ba/(Zr + Ti) | Grain D50 (nm) | Corrected ε |
|---|---|---|---|---|---|---|---|---|---|---|---|---|
| Example 1-1 | 0.2 | 0 | 0 | 0.06 | 0 | 1.4 | 0.2 | 0.6 | 0.3 | 1.00 | 315 | 7115 |
| Example 1-2 | 0.3 | 0 | 0 | 0.06 | 0 | 1.4 | 0.2 | 0.6 | 0.3 | 1.00 | 307 | 7038 |
| Example 1-3 | 0.4 | 0 | 0 | 0.06 | 0 | 1.4 | 0.2 | 0.6 | 0.3 | 1.00 | 302 | 6891 |
| Example 1-4 | 0.5 | 0 | 0 | 0.06 | 0 | 1.4 | 0.2 | 0.6 | 0.3 | 1.00 | 303 | 6795 |
| Example 1-5 | 0.6 | 0 | 0 | 0.06 | 0 | 1.4 | 0.2 | 0.6 | 0.3 | 1.00 | 288 | 6673 |
| Example 1-6 | 0.8 | 0 | 0 | 0.06 | 0 | 1.4 | 0.2 | 0.6 | 0.3 | 1.00 | 301 | 6527 |
| Example 1-7 | 0.2 | 0 | 0.1 | 0.06 | 0 | 1.4 | 0.2 | 0.6 | 0.3 | 1.00 | 304 | 6929 |
| Example 1-8 | 0.3 | 0 | 0.1 | 0.06 | 0 | 1.4 | 0.2 | 0.6 | 0.3 | 1.00 | 290 | 6797 |
| Example 1-9 | 0.4 | 0 | 0.1 | 0.06 | 0 | 1.4 | 0.2 | 0.6 | 0.3 | 1.00 | 301 | 6683 |
| Example 1-10 | 0.5 | 0 | 0.1 | 0.06 | 0 | 1.4 | 0.2 | 0.6 | 0.3 | 1.00 | 309 | 6612 |
| Example 1-11 | 0.6 | 0 | 0.1 | 0.06 | 0 | 1.4 | 0.2 | 0.6 | 0.3 | 1.00 | 293 | 6463 |
| Example 1-12 | 0 | 0 | 0.2 | 0.06 | 0 | 1.4 | 0.2 | 0.6 | 0.3 | 1.00 | 304 | 6809 |
| Example 1-13 | 0.2 | 0 | 0.2 | 0.06 | 0 | 1.4 | 0.2 | 0.6 | 0.3 | 1.00 | 295 | 6597 |
| Example 1-14 | 0.3 | 0 | 0.2 | 0.06 | 0 | 1.4 | 0.2 | 0.6 | 0.3 | 1.00 | 292 | 6493 |
| Example 1-15 | 0.4 | 0 | 0.2 | 0.06 | 0 | 1.4 | 0.2 | 0.6 | 0.3 | 1.00 | 293 | 6376 |
| Example 1-16 | 0.5 | 0 | 0.2 | 0.06 | 0 | 1.4 | 0.2 | 0.6 | 0.3 | 1.00 | 297 | 6289 |
| Example 1-17 | 0.6 | 0 | 0.2 | 0.06 | 0 | 1.4 | 0.2 | 0.6 | 0.3 | 1.00 | 294 | 6226 |
| Example 1-18 | 0 | 0 | 0.4 | 0.06 | 0 | 1.4 | 0.2 | 0.6 | 0.3 | 1.00 | 305 | 6426 |
| Example 1-19 | 0.2 | 0 | 0.4 | 0.06 | 0 | 1.4 | 0.2 | 0.6 | 0.3 | 1.00 | 307 | 6183 |
| Example 1-20 | 0.4 | 0 | 0.4 | 0.06 | 0 | 1.4 | 0.2 | 0.6 | 0.3 | 1.00 | 303 | 6001 |
| Example 1-21 | 0 | 0 | 0.6 | 0.06 | 0 | 1.4 | 0.2 | 0.6 | 0.3 | 1.00 | 303 | 6023 |
| Example 1-22 | 0.2 | 0 | 0.6 | 0.06 | 0 | 1.4 | 0.2 | 0.6 | 0.3 | 1.00 | 300 | 5864 |
| Example 1-23 | 0 | 0 | 0.8 | 0.06 | 0 | 1.4 | 0.2 | 0.6 | 0.3 | 1.00 | 304 | 5696 |
| Example 1-24 | 0 | 0.2 | 0 | 0.06 | 0 | 1.4 | 0.2 | 0.6 | 0.3 | 1.00 | 300 | 6982 |
| Example 1-25 | 0 | 0.5 | 0 | 0.06 | 0 | 1.4 | 0.2 | 0.6 | 0.3 | 1.00 | 297 | 6635 |

TABLE 1-continued

| Sample | Gd | Tb | Dy | Y | Other rare earth | Si | Mn | Mg | Zr | Ba/(Zr + Ti) | Grain D50 (nm) | Corrected ε |
|---|---|---|---|---|---|---|---|---|---|---|---|---|
| Example 1-26 | 0 | 0.8 | 0 | 0.06 | 0 | 1.4 | 0.2 | 0.6 | 0.3 | 1.00 | 306 | 6093 |
| Example 1-27 | 0.3 | 0.2 | 0 | 0.06 | 0 | 1.4 | 0.2 | 0.6 | 0.3 | 1.00 | 297 | 6578 |
| Example 1-28 | 0.4 | 0.2 | 0 | 0.06 | 0 | 1.4 | 0.2 | 0.6 | 0.3 | 1.00 | 291 | 6481 |
| Example 1-29 | 0 | 0.2 | 0.3 | 0.06 | 0 | 1.4 | 0.2 | 0.6 | 0.3 | 1.00 | 301 | 6478 |
| Example 1-30 | 0 | 0.2 | 0.4 | 0.06 | 0 | 1.4 | 0.2 | 0.6 | 0.3 | 1.00 | 291 | 6124 |
| Example 1-31 | 0.2 | 0.2 | 0.2 | 0.06 | 0 | 1.4 | 0.2 | 0.6 | 0.3 | 1.00 | 291 | 6167 |
| Example 1-32 | 0.5 | 0 | 0.1 | 0.06 | Ho 0.1 | 1.4 | 0.2 | 0.6 | 0.3 | 1.00 | 300 | 6613 |
| Example 1-33 | 0.5 | 0 | 0.1 | 0.06 | La 0.1 | 1.4 | 0.2 | 0.6 | 0.3 | 1.00 | 308 | 6599 |
| Example 1-34 | 0.5 | 0 | 0.1 | 0.06 | Sm 0.1 | 1.4 | 0.2 | 0.6 | 0.3 | 1.00 | 296 | 6636 |
| Example 1-35 | 0.5 | 0 | 0.1 | 0.06 | Eu 0.1 | 1.4 | 0.2 | 0.6 | 0.3 | 1.00 | 306 | 6626 |
| Example 1-36 | 0.5 | 0 | 0.1 | 0.06 | Er 0.1 | 1.4 | 0.2 | 0.6 | 0.3 | 1.00 | 294 | 6596 |
| Example 1-37 | 0.5 | 0 | 0.1 | 0.06 | Tm 0.1 | 1.4 | 0.2 | 0.6 | 0.3 | 1.00 | 306 | 6619 |
| Example 1-38 | 0.5 | 0 | 0.1 | 0.06 | Yb 0.1 | 1.4 | 0.2 | 0.6 | 0.3 | 1.00 | 298 | 6624 |

| Sample | $\Delta C_{TC}$ | The number of failures in high temperature loading test | The number of failures in moisture resistance loading test | DC bias characteristics (%) |
|---|---|---|---|---|
| Example 1-1 | −8.2 | 0 | 0 | −66.0 |
| Example 1-2 | −9.4 | 0 | 0 | −65.2 |
| Example 1-3 | −10.6 | 0 | 0 | −63.3 |
| Example 1-4 | −11.5 | 0 | 0 | −61.6 |
| Example 1-5 | −12.1 | 0 | 0 | −59.5 |
| Example 1-6 | −14.5 | 0 | 0 | −58.6 |
| Example 1-7 | −7.9 | 0 | 0 | −64.0 |
| Example 1-8 | −9.0 | 0 | 0 | −62.2 |
| Example 1-9 | −10.0 | 0 | 0 | −61.1 |
| Example 1-10 | −11.0 | 0 | 0 | −59.2 |
| Example 1-11 | −12.0 | 0 | 0 | −58.7 |
| Example 1-12 | −6.7 | 0 | 0 | −61.6 |
| Example 1-13 | −8.8 | 0 | 0 | −60.2 |
| Example 1-14 | −9.8 | 0 | 0 | −58.1 |
| Example 1-15 | −10.8 | 0 | 0 | −56.0 |
| Example 1-16 | −11.8 | 0 | 0 | −56.9 |
| Example 1-17 | −12.8 | 0 | 0 | −54.7 |
| Example 1-18 | −8.4 | 0 | 0 | −57.9 |
| Example 1-19 | −10.4 | 0 | 0 | −54.9 |
| Example 1-20 | −12.4 | 0 | 0 | −52.4 |
| Example 1-21 | −10.0 | 0 | 0 | −52.0 |
| Example 1-22 | −12.0 | 0 | 0 | −51.4 |
| Example 1-23 | −11.6 | 0 | 0 | −49.9 |
| Example 1-24 | −7.4 | 0 | 0 | −64.1 |
| Example 1-25 | −10.2 | 0 | 0 | −58.9 |
| Example 1-26 | −13.0 | 0 | 0 | −53.4 |
| Example 1-27 | −10.4 | 0 | 0 | −58.5 |
| Example 1-28 | −11.4 | 0 | 0 | −58.5 |
| Example 1-29 | −9.8 | 0 | 0 | −58.1 |
| Example 1-30 | −10.6 | 0 | 0 | −53.1 |
| Example 1-31 | −11.0 | 0 | 0 | −53.7 |
| Example 1-32 | −11.8 | 0 | 0 | −59.8 |
| Example 1-33 | −11.7 | 0 | 0 | −60.0 |
| Example 1-34 | −12.4 | 0 | 0 | −59.1 |
| Example 1-35 | −12.3 | 0 | 0 | −59.4 |
| Example 1-36 | −12.6 | 0 | 0 | −60.3 |
| Example 1-37 | −12.5 | 0 | 0 | −59.7 |
| Example 1-38 | −11.9 | 0 | 0 | −58.9 |

TABLE 2

| Sample | Gd | Tb | Dy | Y | Other rare earth | Si | Mn | Mg | Zr | Ba/(Zr + Ti) | Grain D50 (nm) | Corrected ε |
|---|---|---|---|---|---|---|---|---|---|---|---|---|
| Example 1-39 | 0.5 | 0 | 0.1 | 0.00 | 0 | 1.4 | 0.2 | 0.6 | 0.3 | 1.00 | 291 | 6720 |
| Example 1-40 | 0.5 | 0 | 0.1 | 0.30 | 0 | 1.4 | 0.2 | 0.6 | 0.3 | 1.00 | 295 | 6372 |
| Example 1-41 | 0.5 | 0 | 0.1 | 0.50 | 0 | 1.4 | 0.2 | 0.6 | 0.3 | 1.00 | 308 | 6223 |
| Example 1-42 | 0.5 | 0 | 0.1 | 0.06 | 0 | 0 | 0.2 | 1.0 | 0.3 | 1.00 | 293 | 5570 |
| Example 1-43 | 0.5 | 0 | 0.1 | 0.06 | 0 | 0.3 | 0.2 | 0.8 | 0.3 | 1.00 | 303 | 5869 |
| Example 1-44 | 0.5 | 0 | 0.1 | 0.06 | 0 | 0.6 | 0.2 | 0.6 | 0.3 | 1.00 | 292 | 6169 |
| Example 1-45 | 0.5 | 0 | 0.1 | 0.06 | 0 | 0.9 | 0.2 | 0.6 | 0.3 | 1.00 | 308 | 6416 |
| Example 1-46 | 0.5 | 0 | 0.1 | 0.06 | 0 | 1.2 | 0.2 | 0.6 | 0.3 | 1.00 | 306 | 6524 |
| Example 1-47 | 0.5 | 0 | 0.1 | 0.06 | 0 | 1.6 | 0.2 | 0.6 | 0.3 | 1.00 | 300 | 6378 |
| Example 1-48 | 0.5 | 0 | 0.1 | 0.06 | 0 | 2.0 | 0.2 | 0.6 | 0.3 | 1.00 | 296 | 6092 |
| Example 1-49 | 0.5 | 0 | 0.1 | 0.06 | 0 | 2.5 | 0.2 | 0.6 | 0.3 | 1.00 | 308 | 5674 |
| Example 1-50 | 0.5 | 0 | 0.1 | 0.06 | 0 | 1.4 | 0 | 0.9 | 0.3 | 1.00 | 372 | 6923 |
| Example 1-51 | 0.5 | 0 | 0.1 | 0.06 | 0 | 1.4 | 0.05 | 0.8 | 0.3 | 1.00 | 334 | 6804 |
| Example 1-52 | 0.5 | 0 | 0.1 | 0.06 | 0 | 1.4 | 0.1 | 0.6 | 0.3 | 1.00 | 321 | 6703 |
| Example 1-53 | 0.5 | 0 | 0.1 | 0.06 | 0 | 1.4 | 0.25 | 0.6 | 0.3 | 1.00 | 284 | 5904 |

TABLE 2-continued

| Sample | Gd | Tb | Dy | Y | Other rare earth | Si | Mn | Mg | Zr | Ba/(Zr + Ti) | Grain D50 (nm) | Corrected ε |
|---|---|---|---|---|---|---|---|---|---|---|---|---|
| Example 1-54 | 0.5 | 0 | 0.1 | 0.06 | 0 | 1.4 | 0.25 | 0 | 0.3 | 1.01 | 411 | 7052 |
| Example 1-55 | 0.5 | 0 | 0.1 | 0.06 | 0 | 1.4 | 0.25 | 0.1 | 0.3 | 1.005 | 409 | 6969 |
| Example 1-56 | 0.5 | 0 | 0.1 | 0.06 | 0 | 1.4 | 0.2 | 0.3 | 0.3 | 1.00 | 359 | 6797 |
| Example 1-57 | 0.5 | 0 | 0.1 | 0.06 | 0 | 1.4 | 0.2 | 0.9 | 0.3 | 1.00 | 293 | 6328 |
| Example 1-58 | 0.5 | 0 | 0.1 | 0.06 | 0 | 1.4 | 0.2 | 1.2 | 0.3 | 1.00 | 271 | 6070 |
| Example 1-59 | 0.5 | 0 | 0.1 | 0.06 | 0 | 1.4 | 0.2 | 0.6 | 0 | 1.00 | 310 | 6393 |
| Example 1-60 | 0.5 | 0 | 0.1 | 0.06 | 0 | 1.4 | 0.2 | 0.6 | 0.05 | 1.00 | 299 | 6411 |
| Example 1-61 | 0.5 | 0 | 0.1 | 0.06 | 0 | 1.4 | 0.2 | 0.6 | 0.1 | 1.00 | 305 | 6401 |
| Example 1-62 | 0.5 | 0 | 0.1 | 0.06 | 0 | 1.4 | 0.2 | 0.6 | 0.2 | 1.00 | 303 | 6539 |
| Example 1-63 | 0.5 | 0 | 0.1 | 0.06 | 0 | 1.4 | 0.2 | 0.6 | 0.5 | 1.00 | 302 | 6677 |
| Example 1-64 | 0.5 | 0 | 0.1 | 0.06 | 0 | 1.4 | 0.2 | 0.6 | 0.3 | 0.99 | 291 | 6161 |
| Example 1-65 | 0.5 | 0 | 0.1 | 0.06 | 0 | 1.4 | 0.2 | 0.6 | 0.3 | 0.995 | 299 | 6411 |
| Example 1-66 | 0.5 | 0 | 0.1 | 0.06 | 0 | 1.4 | 0.2 | 0.6 | 0.3 | 1.005 | 303 | 6420 |
| Example 1-67 | 0.5 | 0 | 0.1 | 0.06 | 0 | 1.4 | 0.2 | 0.6 | 0.3 | 1.01 | 306 | 6215 |
| Example 1-68 | 0.5 | 0 | 0.1 | 0.06 | 0 | 1.4 | 0.2 | 0.6 | 0.3 | 1.00 | 561 | 7610 |
| Example 1-69 | 0.5 | 0 | 0.1 | 0.06 | 0 | 1.4 | 0.2 | 0.6 | 0.3 | 1.00 | 491 | 7486 |
| Example 1-70 | 0.5 | 0 | 0.1 | 0.06 | 0 | 1.4 | 0.2 | 0.6 | 0.3 | 1.00 | 415 | 7046 |

| Sample | $\Delta C_{TC}$ | The number of failures in high temperature loading test | The number of failures in moisture resistance loading test | DC bias characteristics (%) |
|---|---|---|---|---|
| Example 1-39 | −11.2 | 0 | 0 | −61.9 |
| Example 1-40 | −13.5 | 0 | 0 | −56.8 |
| Example 1-41 | −14.6 | 0 | 0 | −54.4 |
| Example 1-42 | −14.7 | 0 | 0 | −47.0 |
| Example 1-43 | −13.2 | 0 | 0 | −50.9 |
| Example 1-44 | −12.8 | 0 | 0 | −53.8 |
| Example 1-45 | −12.8 | 0 | 0 | −57.4 |
| Example 1-46 | −12.5 | 0 | 0 | −59.2 |
| Example 1-47 | −11.0 | 0 | 0 | −56.9 |
| Example 1-48 | −9.4 | 0 | 0 | −53.1 |
| Example 1-49 | −6.5 | 0 | 0 | −49.4 |
| Example 1-50 | −13.5 | 0 | 0 | −62.9 |
| Example 1-51 | −13.1 | 0 | 0 | −62.5 |
| Example 1-52 | −12.7 | 0 | 0 | −60.3 |
| Example 1-53 | −11.5 | 0 | 0 | −51.7 |
| Example 1-54 | −14.1 | 0 | 0 | −64.0 |
| Example 1-55 | −13.3 | 0 | 0 | −63.4 |
| Example 1-56 | −12.8 | 0 | 0 | −62.2 |
| Example 1-57 | −11.2 | 0 | 0 | −55.7 |
| Example 1-58 | −10.5 | 0 | 0 | −53.1 |
| Example 1-59 | −9.0 | 0 | 0 | −57.5 |
| Example 1-60 | −9.5 | 0 | 0 | −56.5 |
| Example 1-61 | −10.3 | 0 | 0 | −58.1 |
| Example 1-62 | −11.1 | 0 | 0 | −58.7 |
| Example 1-63 | −14.6 | 0 | 0 | −59.8 |
| Example 1-64 | −10.3 | 0 | 0 | −54.9 |
| Example 1-65 | −11.7 | 0 | 0 | −56.7 |
| Example 1-66 | −13.5 | 0 | 0 | −56.7 |
| Example 1-67 | −14.6 | 0 | 0 | −55.2 |
| Example 1-68 | −14.9 | 0 | 0 | −74.6 |
| Example 1-69 | −14.2 | 0 | 0 | −69.7 |
| Example 1-70 | −13.0 | 0 | 0 | −65.0 |

TABLE 3

| Sample | Gd | Tb | Dy | Y | Other rare earth | Si | Mn | Mg | Zr | Ba/(Zr + Ti) | Grain D50 (nm) | Corrected ε |
|---|---|---|---|---|---|---|---|---|---|---|---|---|
| Comparative example 1-1 | 0.1 | 0 | 0 | 0.06 | 0 | 1.4 | 0.2 | 0.6 | 0.3 | 1.00 | 318 | 7080 |
| Comparative example 1-2 | 0.9 | 0 | 0 | 0.06 | 0 | 1.4 | 0.2 | 0.6 | 0.3 | 1.00 | 468 | 7158 |
| Comparative example 1-3 | 0.5 | 0 | 0.1 | 0.80 | 0 | 1.4 | 0.2 | 0.6 | 0.3 | 1.00 | 480 | 7256 |
| Comparative example 1-4 | 0.5 | 0 | 0.1 | 0.06 | 0 | 3.0 | 0.2 | 0.6 | 0.3 | 1.00 | 292 | 5328 |
| Comparative example 1-5 | 0.5 | 0 | 0.1 | 0.06 | 0 | 1.4 | 0.4 | 0.6 | 0.3 | 1.00 | 275 | 5067 |
| Comparative example 1-6 | 0.5 | 0 | 0.1 | 0.06 | 0 | 1.4 | 0.2 | 1.5 | 0.3 | 1.00 | 267 | 5931 |
| Comparative example 1-7 | 0.5 | 0 | 0.1 | 0.06 | 0 | 1.4 | 0.2 | 0.6 | 0.6 | 1.00 | 469 | 7240 |
| Comparative example 1-8 | 0.5 | 0 | 0.1 | 0.06 | 0 | 1.4 | 0.2 | 0.6 | 0.3 | 0.985 | 307 | 6130 |
| Comparative | 0.5 | 0 | 0.1 | 0.06 | 0 | 1.4 | 0.2 | 0.6 | 0.3 | 1.015 | 479 | 7180 |

TABLE 3-continued example 1-9

| Sample | $\Delta C_{TC}$ | The number of failures in high temperature loading test | The number of failures in moisture resistance loading test | DC bias characteristics (%) |
|---|---|---|---|---|
| Comparative example 1-1 | −6.8 | 30 | 24 | −65.2 |
| Comparative example 1-2 | −15.6 | 0 | 0 | −65.8 |
| Comparative example 1-3 | −15.9 | 0 | 0 | −67.4 |
| Comparative example 1-4 | −5.7 | 0 | 0 | −44.3 |
| Comparative example 1-5 | −7.0 | 0 | 0 | −41.2 |
| Comparative example 1-6 | −9.4 | 3 | 4 | −51.9 |
| Comparative example 1-7 | −15.4 | 0 | 0 | −66.1 |
| Comparative example 1-8 | −8.8 | 5 | 6 | −54.8 |
| Comparative example 1-9 | −15.9 | 0 | 0 | −65.8 |

(Conditions of Elements Gd, Tb, and Dy)

As is clear from Comparative example 1-1 shown in Table 3, in the case where the content of Gd in a $Gd_2O_3$ compound contained in the ceramic raw material powder is 0.1 parts by mole and the content of Tb in a $Tb_2O_3$ compound and the content of Dy in a $Dy_2O_3$ compound are 0 parts by mole, the number of failures in the high temperature loading test is 30 and the number of failures in the moisture resistance loading test is 24, so that the number of failures is very large.

Also, as is clear from Comparative example 1-2, in the case where the content of Gd in a $Gd_2O_3$ compound contained in the ceramic raw material powder is 0.9 parts by mole and the content of Tb in a $Tb_2O_3$ compound and the content of Dy in a $Dy_2O_3$ compound are 0 parts by mole, the rate of change in electrostatic capacitance with temperature $\Delta C_{TC}$ is −15.6% and, therefore, is more than the range of ±15%.

(Addition of Other Rare Earth Element)

In addition, when Example 1-32 shown in Table 1 is compared with Example 1-10, the content (parts by mole) of Gd, the content (parts by mole) of Tb, the content (parts by mole) of Dy, the content (parts by mole) of Y, and the like are the same, although 0.1 parts by mole of Ho in a $Ho_2O_3$ is contained as a secondary component. However, the effects of the present invention are not changed, and high reliability and good temperature characteristics are obtained with a high relative dielectric constant ∈ of more than 5,500. Likewise, as shown in Example 1-33 to Example 1-38, high reliability and good temperature characteristics are obtained with a high relative dielectric constant ∈ even when the ceramic raw material powder contains 0.1 parts by mole of each of La in a $La_2O_2$ compound, Sm in a $Sm_2O_2$ compound, Eu in a $Eu_2O_2$ compound, Er in an $Er_2O_2$ compound, Tm in a $Tm_2O_2$ compound, and Yb in an $Yb_2O_2$ compound is contained.

(Condition of Element Y)

As is clear from Comparative example 1-3 shown in Table 3, in the case where the content of Y in an $Y_2O_2$ compound contained in the ceramic raw material powder is 0.8 parts by mole, the rate of change in electrostatic capacitance with temperature $\Delta C_{TC}$ is −15.9% and, therefore, is more than the range of ±15%.

(Condition of Element Si)

As is clear from Comparative example 1-4 shown in Table 3, in the case where the content of Si in a $SiO_2$ compound contained in the ceramic raw material powder is 3.0 parts by mole, the relative dielectric constant (corrected c) is less than 5,500 and is too low.

(Condition of Element Mn)

As is clear from Comparative example 1-5 shown in Table 3, in the case where the content of Mn in a $MnCO_3$ compound contained in the ceramic raw material powder is 0.4 parts by mole, the relative dielectric constant (corrected c) is less than 5,500 and is too low.

(Condition of Element Mg)

As is clear from Comparative example 1-6 shown in Table 3, in the case where the content of Mg in a $MgCO_3$ compound contained in the ceramic raw material powder is 1.5 parts by mole, the number of failures in the high temperature loading test is 3 and the number of failures in the moisture resistance loading test is 4, so that the number of failures is large.

(Condition of Element Zr)

As is clear from Comparative example 1-7 shown in Table 3, in the case where the content of Zr in a $ZrO_2$ compound contained in the ceramic raw material powder is 0.6 parts by mole, the rate of change in electrostatic capacitance with temperature $\Delta C_{TC}$ is −15.4% and, therefore, is more than the range of ±15%.

(Condition of Molar Ratio)

As is clear from Comparative example 1-8 shown in Table 3, in the case where the content of Ba contained in the ceramic raw material powder/(the content of Zr contained in the ceramic raw material powder+the content of Ti contained in the ceramic raw material powder) is 0.985, the number of failures in the high temperature loading test is 5 and the number of failures in the moisture resistance loading test is 6, so that the number of failures is large.

Also, as is clear from Comparative example 1-9 shown in Table 3, in the case where the content of Ba contained in the ceramic raw material powder/(the content of Zr contained in the ceramic raw material powder+the content of Ti contained in the ceramic raw material powder) is 1.015, the rate of change in electrostatic capacitance with temperature $\Delta C_{TC}$ is −15.9% and, therefore, is more than the range of ±15%.

On the other hand, as in Example 1-1 to Example 1-70 shown in Table 1 and Table 2, in the case where the total content of Ti in the ceramic raw material powder is specified to be 100 parts by mole and as for the conditions, (a) the content a (parts by mole) of at least one type of element selected from the group consisting of Gd in a $Gd_2O_3$ compound contained in the ceramic raw material powder, Tb in a $Tb_2O_3$ compound, and Dy in a $Dy_2O_3$ compound satisfies $0.2 \leq a \leq 0.8$, (b) the content b (parts by mole) of Y in a $Y_2O_3$ compound contained in the ceramic raw material powder satisfies $0.0 \leq b \leq 0.5$, (c) the content c (parts by mole) of Si in a $SiO_2$ compound contained in the ceramic raw material powder satisfies $0.0 \leq c \leq 2.5$, (d) the content d (parts by mole) of Mn in a $MnCO_3$ compound contained in the ceramic raw material powder satisfies $0.0 \leq d \leq 0.25$, (e) the content e (parts by mole) of Mg in a $MgCO_3$ compound contained in the ceramic raw material powder satisfies $0.0 \leq e \leq 1.2$, (f) the content f (parts by mole) of Zr in a $ZrO_2$ compound contained in the ceramic raw material powder satisfies $0.0 \leq f \leq 0.5$, and (g) the molar ratio m of the content of Ba contained in the ceramic raw material powder/(the content of Zr contained in the ceramic raw material powder+the content of Ti contained in the ceramic raw material powder) satisfies $0.99 \leq m \leq 1.01$, the number of failures in the high temperature loading test and the number of failures in the moisture resistance loading test are 0 and the rate of change in electrostatic capacitance with temperature $\Delta C_{TC}$ is within ±15%. In addition, the relative dielectric constant (corrected $\in$) is more than 5,500, and the numerical value of the DC bias characteristics is larger than −70% (put another way, the rate of decrease in DC bias characteristics is smaller than 70%). Therefore, it is clear that high reliability and good temperature characteristics are obtained with a high relative dielectric constant $\in$.

In addition, as is clear from Example 1-64 to Example 1-67 shown in Table 2, the rate of change in electrostatic capacitance with temperature $\Delta C_{TC}$ is degraded as the molar ratio m increases, although the DC bias characteristics and the relative dielectric constant $\in$ are not changed substantially.

(Condition of Crystal Grain Size)

As is clear from Example 1-68 shown in Table 2, in the case where the average grain size of crystal grains of the dielectric ceramic layer 6 is 0.561 μm, the high relative dielectric constant $\in$, high reliability, and good temperature characteristics are exhibited, although the rate of change in electrostatic capacitance with temperature $\Delta C_{TC}$ is −14.9% and, therefore, is close to the limit value of the range of ±15% and the rate of decrease in DC bias characteristics is a large 74.6%.

On the other hand, as in Example 1-69 and Example 1-70 shown in Table 2, in the case where the average grain size of crystal grains of the dielectric ceramic layer 6 is 0.5 μm or less, the rate of change in electrostatic capacitance with temperature $\Delta C_{TC}$ is improved to −14.2% and, in addition, the rate of decrease in DC bias characteristics is improved to less than 70%. That is, as the crystal grain size (grain size) decreases, the relative dielectric constant $\in$ and the rate of change in electrostatic capacitance with temperature $\Delta C_{TC}$ become better and the rate of decrease in DC bias characteristics decreases.

In this regard, the present invention is not limited to the above-described embodiments and is variously modified within the scope of the gist thereof. For example, the thickness of the ceramic layer of the monolithic ceramic capacitor, the number of layers, the opposite electrode area, and the outer dimensions are not limited to those described above.

REFERENCE SIGNS LIST

1 monolithic ceramic capacitor
2, 4 inner electrode
6 dielectric ceramic layer
10 multilayer body
20, 22 outer electrode

The invention claimed is:

1. A monolithic ceramic capacitor comprising:
a multilayer body having a plurality of dielectric ceramic layers and a plurality of inner electrodes disposed at interfaces between the plurality of dielectric ceramic layers; and
outer electrodes on the outer surface of the multilayer body and electrically connected to the inner electrodes,
wherein the multilayer body contains a perovskite compound including Ba and Ti, contains at least one element selected from the group consisting of Gd, Tb, and Dy, contains Si, contains Mg, and contains at least two elements selected from the group consisting of Y, Mn, and Zr, and in the multilayer body:
(a) the content a (parts by mole) of the at least one element selected from the group consisting of Gd, Tb, and Dy is $0.2 \leq a \leq 0.8$,
(b) the content b (parts by mole) of Y, when Y is present, b is up to 0.5,
(c) the content c (parts by mole) of Si is $0.9 \leq c \leq 1.6$,
(d) the content d (parts by mole) of Mn, when Mn is present, is up to 0.25,
(e) the content e (parts by mole) of Mg is $0.1 \leq e \leq 1.2$,
(f) the content f (parts by mole) of Zr, when Zr is present, is up to 0.5, and
(g) the molar ratio m of the content of Ba/(the content of Zr+the content of Ti) is $0.995 \leq m \leq 1.005$,
where a total content of Ti is 100 parts by mole.

2. The monolithic ceramic capacitor according to claim 1, wherein, in the case where the multilayer body is made into a solution by a dissolution treatment and the total content of Ti is specified to be 100 parts by mole, the solution includes:
(a) the content a (parts by mole) of at least one element selected from the group consisting of Gd, Tb, and Dy satisfies $0.2 \leq a \leq 0.8$,
(b) the content b (parts by mole) of Y, when Y is present, is up to 0.5,
(c) the content c (parts by mole) of Si satisfies $0.9 \leq c \leq 1.6$,
(d) the content d (parts by mole) of Mn, when Mn is present, is up to 0.25,
(e) the content e (parts by mole) of Mg is $0.1 \leq e \leq 1.2$,
(f) the content f (parts by mole) of Zr, when Zr is present, is up to 0.5, and
(g) the molar ratio m of the content of Ba/(the content of Zr+the content of Ti) is $0.995 \leq m \leq 1.005$.

3. The monolithic ceramic capacitor according to claim 1, wherein the plurality of dielectric ceramic layers have crystal grains and an average grain size of the crystal grains is 0.5 μm or less.

4. The monolithic ceramic capacitor according to claim 1, wherein a relative dielectric constant $\in$ of the dielectric ceramic layers is more than 5,500.

5. The monolithic ceramic capacitor according to claim 1, wherein the inner electrode contains Ni or a Ni alloy as a primary component.

6. A monolithic ceramic capacitor comprising:

a multilayer body having a plurality of dielectric ceramic layers and a plurality of inner electrodes disposed at interfaces between the plurality of dielectric ceramic layers; and outer electrodes on the outer surface of the multilayer body and electrically connected to the inner electrodes, wherein the dielectric ceramic layers contains a perovskite compound including Ba and Ti, contains at least one element selected from the group consisting of Gd, Tb, and Dy, contains Si, contains Mg, and contains at least two elements selected from the group consisting of Y, Mn, and Zr, and in the dielectric ceramic layers:

(a) the content a (parts by mole) of the at least one element selected from the group consisting of Gd, Tb, and Dy is $0.2 \leq a \leq 0.8$, (b) the content b (parts by mole) of Y, when Y is present, b is up to 0.5, (c) the content c (parts by mole) of Si is $0.9 \leq c \leq 1.6$, (d) the content d (parts by mole) of Mn, when Mn is present, is up to 0.25, (e) the content e (parts by mole) of Mg is $0.1 \leq e \leq 1.2$, (f) the content f (parts by mole) of Zr, when Zr is present, is up to 0.5, and (g) the molar ratio m of the content of Ba/(the content of Zr+the content of Ti) is $0.995 \leq m \leq 1.005$, where a total content of Ti is 100 parts by mole.

7. The monolithic ceramic capacitor according to claim 6, wherein the plurality of dielectric ceramic layers have crystal grains and an average grain size of the crystal grains is 0.5 μm or less.

8. The monolithic ceramic capacitor according to claim 6, wherein a relative dielectric constant $\in$ of the dielectric ceramic layers is more than 5,500.

9. The monolithic ceramic capacitor according to claim 6, wherein the inner electrode contains Ni or a Ni alloy as a primary component.

10. A method for manufacturing a monolithic ceramic capacitor, the method comprising:

obtaining a ceramic slurry by adding a compound containing at least one element selected from the group consisting of Gd, Tb, and Dy to a powder containing a perovskite compound including Ba and Ti, adding a compound containing Si, adding a compound containing Mg, adding at least two compounds selected from the group consisting of compounds containing Y, compounds containing Mn, and compounds containing Zr, and performing mixing and slurrying;

producing ceramic green sheets by forming the ceramic slurry into the shape of a sheet;

forming an unfired multilayer body in which the ceramic green sheets and conductor patterns are stacked; and firing the unfired multilayer body to produce a multilayer body having inner electrodes disposed at interfaces between a plurality of dielectric ceramic layers, wherein in the ceramic slurry, (a) the content a (parts by mole) of the at least one element selected from the group consisting of Gd, Tb, and Dy is $0.2 \leq a \leq 0.8$, (b) the content b (parts by mole) of Y, when Y is present, b is up to 0.5, (c) the content c (parts by mole) of Si is $0.9 \leq c \leq 1.6$, (d) the content d (parts by mole) of Mn, when Mn is present, is up to 0.25, (e) the content e (parts by mole) of Mg is $0.1 \leq e \leq 1.2$, (f) the content f (parts by mole) of Zr, when Zr is present, is up to 0.5, and (g) the molar ratio m of the content of Ba/(the content of Zr+the content of Ti) is $0.995 \leq m \leq 1.005$, where a total content of Ti is 100 parts by mole.

11. The method for manufacturing a monolithic ceramic capacitor according to claim 10, wherein the plurality of dielectric ceramic layers have crystal grains and an average grain size of the crystal grains is 0.5 μm or less.

12. The method for manufacturing a monolithic ceramic capacitor according to claim 10, wherein a relative dielectric constant $\in$ of the dielectric ceramic layers is more than 5,500.

13. The method for manufacturing a monolithic ceramic capacitor according to claim 10, wherein the inner electrodes contain Ni or a Ni alloy as a primary component.

14. A method for manufacturing a monolithic ceramic capacitor, the method comprising:

adding a compound containing at least one element selected from the group consisting of Gd, Tb, and Dy to a powder containing a perovskite compound including Ba and Ti, adding a compound containing Si, adding a compound containing Mg, adding at least two compounds selected from the group consisting of compounds containing Y, compounds containing Mn, and compounds containing Zr, performing mixing to obtain a mixture, and obtaining a ceramic slurry by slurrying the resulting mixture;

producing ceramic green sheets by forming the ceramic slurry into the shape of a sheet;

forming an unfired multilayer body in which the ceramic green sheets and conductor patterns are stacked; and firing the unfired multilayer body to produce a multilayer body in which inner electrodes are disposed at interfaces between a plurality of dielectric ceramic layers, wherein in the mixture, (a) the content a (parts by mole) of the at least one element selected from the group consisting of Gd, Tb, and Dy is $0.2 \leq a \leq 0.8$, (b) the content b (parts by mole) of Y, when Y is present, b is up to 0.5, (c) the content c (parts by mole) of Si is $0.9 \leq c \leq 1.6$, (d) the content d (parts by mole) of Mn, when Mn is present, is up to 0.25, (e) the content e (parts by mole) of Mg is $0.1 \leq e \leq 1.2$, (f) the content f (parts by mole) of Zr, when Zr is present, is up to 0.5, and (g) the molar ratio m of the content of Ba/(the content of Zr+the content of Ti) is $0.995 \leq m \leq 1.005$, where a total content of Ti is 100 parts by mole.

15. The method for manufacturing a monolithic ceramic capacitor according to claim 14, wherein the plurality of dielectric ceramic layers have crystal grains and an average grain size of the crystal grains is 0.5 μm or less.

16. The method for manufacturing a monolithic ceramic capacitor according to claim 14, wherein a relative dielectric constant $\in$ of the dielectric ceramic layers is more than 5,500.

17. The method for manufacturing a monolithic ceramic capacitor according to claim 14, wherein the inner electrodes contain Ni or a Ni alloy as a primary component.

* * * * *